T. P. FARMER.
Drill-Bit.

No. 161,106.  Patented March 23, 1875.

Witnesses,
Joseph W. Ross.
W. J. Cambridge

Inventor,
Theodore P. Farmer,
Per Teschemacher & Stearns
Attorneys

THE GRAPHIC CO. PHOTO-LITH. 39 & 41 PARK PLACE, N.Y.

UNITED STATES PATENT OFFICE.

THEODORE P. FARMER, OF BOSTON, MASSACHUSETTS.

IMPROVEMENT IN DRILL-BITS.

Specification forming part of Letters Patent No. 161,106, dated March 23, 1875; application filed January 18, 1875.

*To all whom it may concern:*

Be it known that I, THEODORE P. FARMER, of Boston, in the county of Suffolk and State of Massachusetts, have invented certain Improvements in the Manufacture of Drills and Reamers, of which the following is a full, clear, and exact description, reference being had to the accompanying drawings, making part of this specification, in which—

Figure 1:
Figure 2:
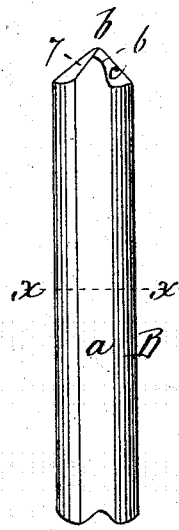
Figure 3:
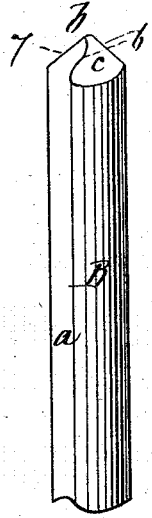
Figure 4:
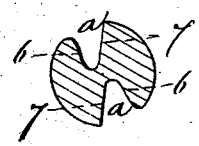
Figure 5:
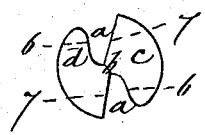

Figure 1 represents a grooved rod or wire, made to be cut into lengths to form drills and reamers. Fig. 2 is a perspective view of my improved drill, looking immediately in front of one of the grooves. Fig. 3 is also a perspective, looking at the drill from a different position. Fig. 4 is a horizontal section on the line $x\ x$ of Fig. 2. Fig. 5 is a plan, looking at the point of the drill.

My invention consists in certain improvements in drills, hereinafter described and claimed.

To enable others skilled in the art to understand and use my invention, I will proceed to describe the manner in which I have carried it out.

In Fig. 1 of said drawings is represented a round rod or wire, A, of any desired length, provided with longitudinal grooves $a\ a$ on two of its opposite sides, these grooves being produced in the operation of drawing the metal, or in any other suitable manner, the form of groove being that shown in Fig. 4. To make a drill, B, from this rod, in accordance with my invention, a piece of the desired length is cut off, and one end ground so as to produce a point, $b$, as seen in Figs. 2, 3, and 5. In forming the point $b$ the end of the rod is ground off on each side at an angle, so as to form the rounded faces $c\ d$, each extending upward from the curved line 6 (formed by the junction of the curved side of the groove $a$ with the face) to the top of the straight cutting-edge 7, which is formed by the junction of the straight side of the groove $a$ with the face. The cutting edges 7 7 are thus caused to project beyond the curved edges 6, so as to come in contact with and cut the metal to be bored, the chips passing up and out of the grooves as the work proceeds.

What I claim as my invention, and desire to secure by Letters Patent, is—

A drill, B, having longitudinal straight grooves $a\ a$ extending its entire length, the cutting-edges 6 6, and point $b$, as described, for the purpose set forth.

Witness my hand this 13th day of January, 1875.

THEODORE P. FARMER.

In presence of—
N. W. STEARNS,
W. J. CAMBRIDGE.